(12) United States Patent
Schalla et al.

(10) Patent No.: US 8,387,918 B2
(45) Date of Patent: Mar. 5, 2013

(54) MULTI-DIRECTIONAL SUPPORT ARM

(75) Inventors: James P. Schalla, Seattle, WA (US); Richard L. Rankin, Lake Stevens, WA (US); Dennis C. Lin, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 907 days.

(21) Appl. No.: 11/532,458

(22) Filed: Sep. 15, 2006

(65) Prior Publication Data
US 2008/0078872 A1  Apr. 3, 2008

(51) Int. Cl.
*B64C 1/06* (2006.01)

(52) U.S. Cl. .................. 244/131; 244/118.1; 244/119

(58) Field of Classification Search .............. 244/117 R, 244/118.1, 119, 12.91, 131, 118.5
See application file for complete search history.

(56) References Cited

U.S. PATENT DOCUMENTS

| | | | |
|---|---|---|---|
| 2,938,687 A * | 5/1960 | Krapf, Jr. .................... | 244/129.1 |
| 4,763,360 A * | 8/1988 | Daniels et al. ............... | 455/3.06 |
| 5,083,727 A * | 1/1992 | Pompei et al. ............. | 244/118.6 |
| 6,305,645 B1 | 10/2001 | Moore | |
| 6,536,710 B1 * | 3/2003 | Bobzien et al. ............... | 244/119 |
| 6,615,421 B2 | 9/2003 | Itakura | |
| 6,655,313 B1 | 12/2003 | Woodall et al. | |
| 6,655,633 B1 * | 12/2003 | Chapman, Jr. ............. | 244/123.9 |
| 6,883,753 B1 * | 4/2005 | Scown ....................... | 244/118.1 |
| 7,237,749 B2 | 7/2007 | Ritts et al. | |
| 2006/0231681 A1 * | 10/2006 | Huber et al. .................. | 244/119 |

FOREIGN PATENT DOCUMENTS

| | | |
|---|---|---|
| WO | WO/98/03398 | 1/1998 |
| WO | WO 01/50918 | 7/2001 |
| WO | WO 03/024280 | 3/2003 |
| WO | WO 2004/009399 | 1/2004 |
| WO | WO 2004/009400 | 1/2004 |

\* cited by examiner

*Primary Examiner* — Philip J Bonzell
(74) *Attorney, Agent, or Firm* — Klintworth & Rozenblat IP LLC

(57) ABSTRACT

A compartment for a transportation device is provided. The compartment may include a one-piece basin, an inflatable wall member, and multi-directional support arms to attach the basin within the transportation device. The one-piece basin may fit through an opening in the transportation device. Methods of installation for installing the compartment within the transportation device are also provided.

17 Claims, 9 Drawing Sheets

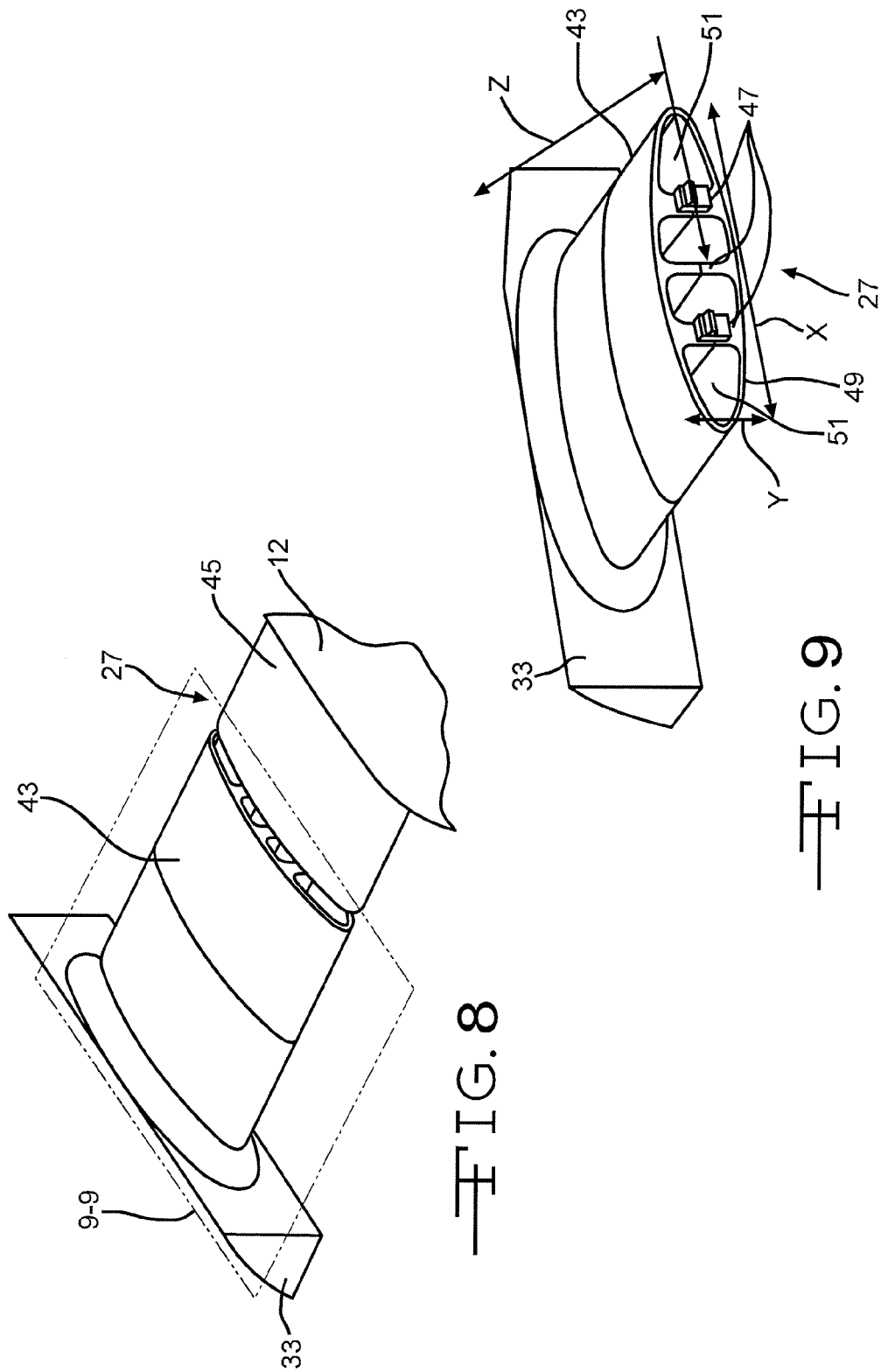

MULTI-DIRECTIONAL SUPPORT ARM

BACKGROUND OF THE INVENTION

The present application relates generally to compartments within transportation devices, such as to an overhead rest compartment within an aircraft.

The compartments within transportation devices are sometimes made of a multitude of large, attached, separate parts. For instance, an overhead rest compartment within an aircraft may be made of several large honeycomb panels that are assembled together to form large assemblies. These assemblies are typically larger than the transportation device entry door and must be separated and brought through the door of the aircraft as smaller pieces, and then subsequently attached together within the aircraft, utilizing a large number of fasteners and brackets, in order to form the compartment. These compartments are sometimes supported by a multitude of axial, tension, tie-rods which may need to be configured in particular orientations in order to transfer forces to the skin and/or frame of the transportation device.

Utilizing a multitude of attached, separate parts to form the compartment may require additional attachment parts which may lead to increased cost, increased labor, increased time, increased likelihood of break-down, increased difficulty in assemblying the compartment, increased weight, and/or to additional problems. Moreover, the use of axial, tension, tie-rods to support the compartments may similarly lead to excess parts, inefficiency in space, increased time, increased labor, increased cost, increased break-down, and increased problems associated with assemblying the compartment, amongst additional types of problems.

A compartment, support arm, and/or method of installation is needed which may solve one or more problems in one or more of the existing compartments, support arms, and/or methods of installation.

SUMMARY OF THE INVENTION

In one embodiment of the invention, a support arm in an aircraft is attached at one end to an interior component, and is attached at another end to at least one of a skin of the aircraft, a frame of the aircraft, and an inter-costal member connected to the frame of the aircraft. The support arm is under shear, tension, and compression loads in at least partially X, Y, and Z directions.

In another embodiment of the invention, a support arm attaching an internal aircraft structure to an aircraft comprises a first member which is at least partially oriented in the X direction, and a second member which is at least partially oriented in the Y direction. At least one of the first and second members is also at least partially oriented in the Z direction.

In another embodiment of the invention, a method of attaching a structure within an aircraft comprises attaching a support arm to the structure, attaching the support arm to at least one of a skin of the aircraft, a frame of the aircraft, and an inter-costal member connected to the frame of the aircraft, and loading the support arm under shear and tension loads in at least partially X, Y, and Z directions.

These and other embodiments of the present application will be discussed more fully in the detailed description. The features, functions, and advantages can be achieved independently in various embodiments of the present application, or may be combined in yet other embodiments.

BRIEF DESCRIPTION OF THE DRAWINGS

FIG. 8 shows a partially, unassembled perspective view within rectangle 8-8 of the embodiment depicted in FIG. 7;

FIG. 9 shows a partially unassembled, perspective view within rectangle 9-9 of the embodiment shown in FIG. 8.

Like reference numbers and designations in the various drawings indicate like elements.

DETAILED DESCRIPTION OF THE INVENTION

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1:
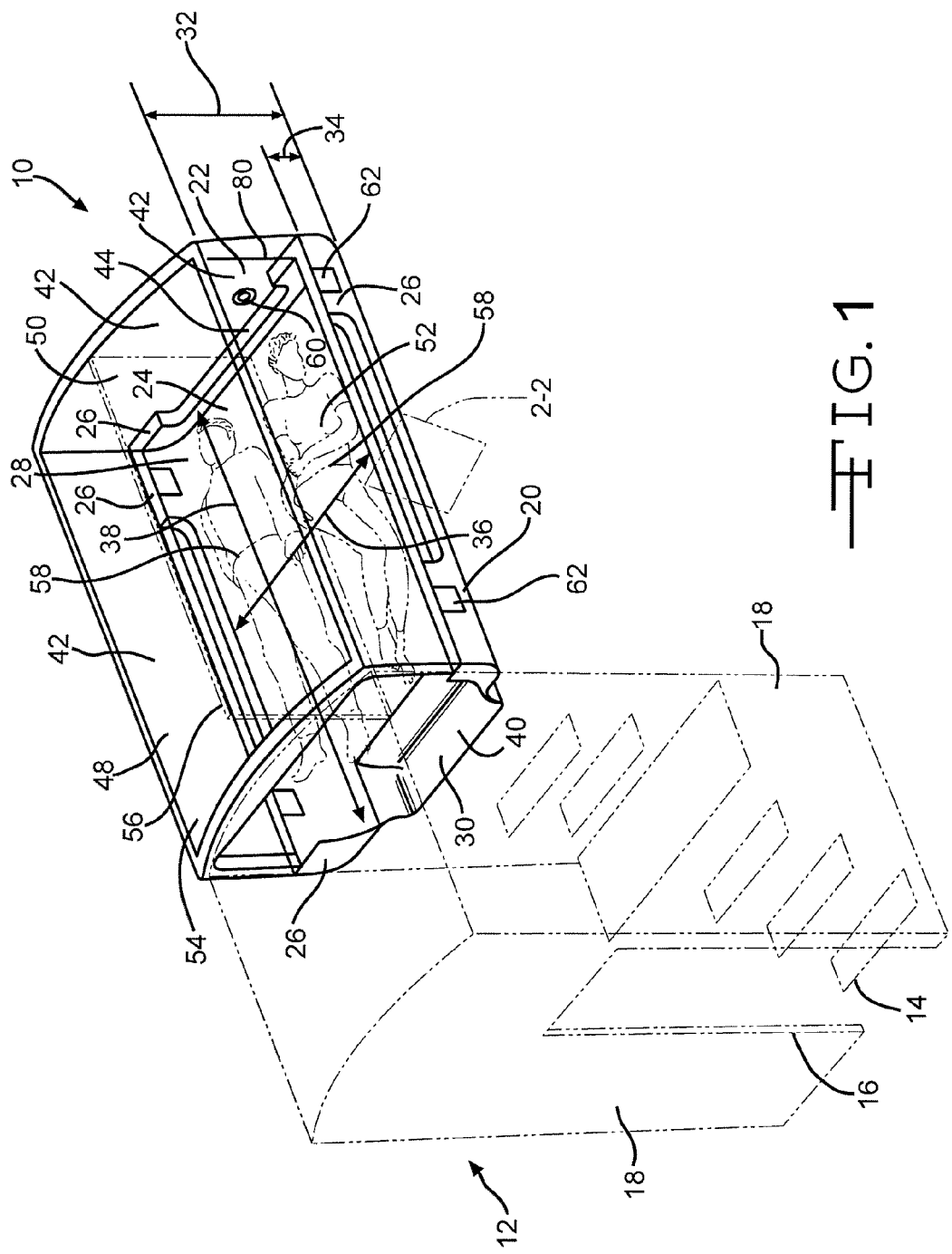
FIG. 1 shows a perspective view of a compartment and attached monument according to one embodiment of the invention which may be used in a transportation device.

FIG. 1 shows a perspective view of a compartment 10 and attached monument 12 according to one embodiment of the invention which may be used in a transportation device such as an aircraft, boat, train, automobile, vehicle, bus, or truck. The monument 12 may comprise a stairway 14 including a doorway 16 and walls 18. The stairway 14 may provide one or more persons with access to the compartment 10. The doorway 16 may enable one or more persons to close off the monument 12 for privacy. The walls 18 may enclose the monument 12 and provide structural support for the stairway 14. The compartment 10 may be installed in an overhead position within the transportation device in other embodiments, the compartment 10 may be installed in varying locations, orientations, and configurations within the transportation device. In additional embodiments, the attached monument 12 may comprise varying structures such as a stowage area, a galley area, or other types of structures, while the compartment 10 may comprise varying structures such as a rest area, storage area, overhead area, and/or a privacy area.

The compartment 10 may include a one-piece basin 20 and an attached retractable and extendable enclosure member 22, which is shown in FIG. 1 in an inflated, extended state. The size of the basin 20 may be chosen to allow the basin to fit through an opening in the transportation device, such as through a door. The basin 20 may serve as the primary load bearing member of the compartment 10. In other embodiments, the one-piece basin 20 may be adapted to be attached to a retractable and extendable enclosure member 22.

The one-piece basin 20 may be made of a fiber-resin composite, may be injected-molded, may be made of a honeycomb panel, and/or may be made utilizing other materials or methods. Systems such as electrical systems or ECS (Environmental Control Systems) ducting systems may be integrated into the one-piece basin 20. The one-piece basin 20 may comprise a substantially flat base member 24 forming a floor surface of the compartment 10, side-walls 26 extending in non-parallel relationship to base member 24, a cavity 28 formed in between the base member 24 and side-walls 26, and a knee-hub 30. The side-walls 26 may substantially extend around a periphery of the base member 24. The one-piece basin 20 may obviate the need for brackets to support the side-walls 26, which may make the entire compartment 10 lighter.

The side-walls 26 may curve upward, or may extend straight upward from the base member 24. In one embodiment, the side-walls 26 may extend between six inches and two feet up from the base member 24. For example, in one embodiment, the side-walls 26 may extend one foot up from base member 24. The side-walls 26 may extend perpendicularly to base member 24. The side-walls 26 may not extend a full height 32 of the compartment 10, and may have a height dimension 34 which is less than both a width 36 and a length dimension 38 of the base member 24. In other embodiments, the side-walls 26, base member 24, and basin 20 may be in a variety of sizes, shapes, orientations, and configurations.

The knee-hub 30 may comprise a lowered stepped surface 40 for entering the attached monument 12 from the compartment 10. The lowered stepped surface 40 may comprise a flat portion parallel to base member 24 and between six inches and two feet below base member 24. The knee-hub 30 may be supported by walls extending from and integral to base member 24. In other embodiments, the one-piece basin 20 may be in differing shapes, sizes, orientations, and/or configurations.

Figure 2:
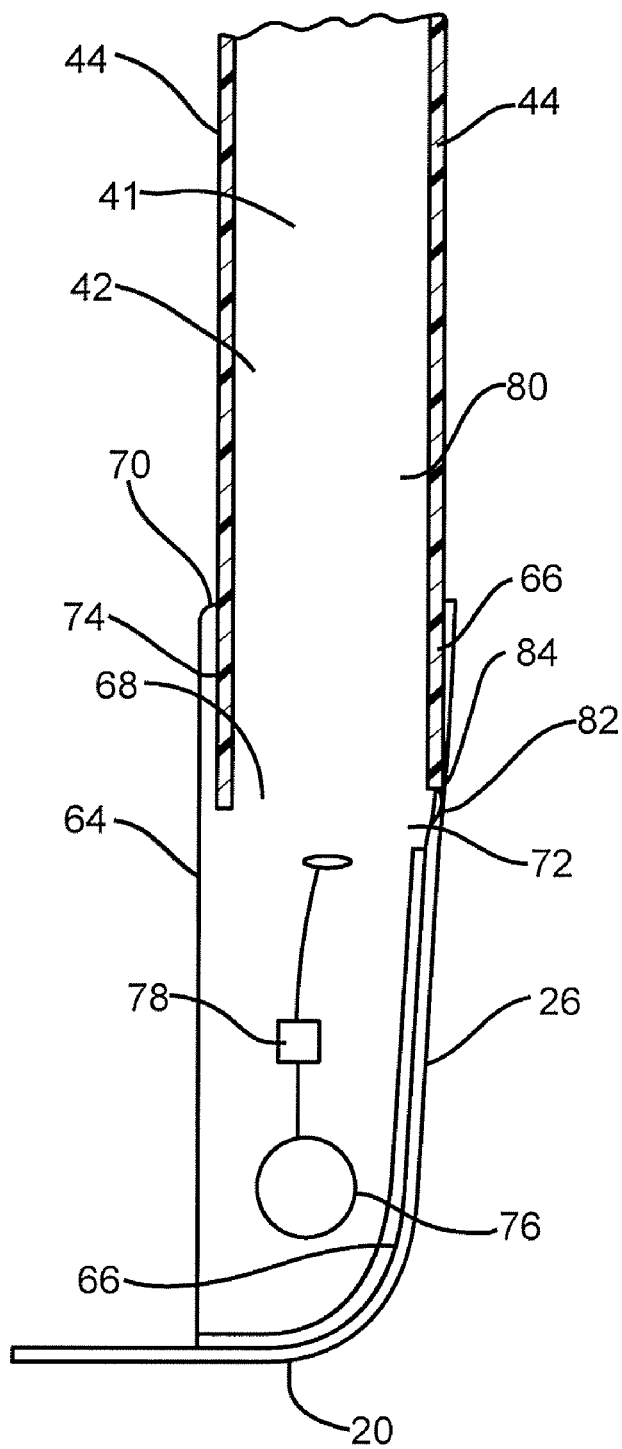
FIG. 2 shows a partial sectional, side view within rectangle 2-2 of the embodiment depicted in FIG. 1.

The enclosure member 22 may comprise inflatable gas-walls (or inflatable members) 42 which may have one or more inflatable internal cavities 41 (as shown in FIG. 2) which are inflated utilizing a pump 76 (as shown in FIG. 2) to enclose the gas-walls 42 of the compartment 10 around the basin 20. In other embodiments, the enclosure member 22 may comprise other types of retractable and extendable members, such as a fabric, non-inflatable enclosure member. The inflatable walls 42 may be made of Polyurethane, but in other embodiments may be made of differing materials. The inflatable walls 42 may be colored to prevent light from entering the compartment 10 and to create a nurturing, comfortable environment. In one embodiment, the inflatable walls 42 may be between one and five inches thick in the inflated position. A surface 44 of the inflatable walls 42 may comprise a protective cover made of at least one of Kevlar and Nomex. In other embodiments, other materials may be utilized which provide puncture and/or flammability resistance, such as Basofil, and/ or Spider Silk composites. The protective cover may cover only the outside surface of the inflatable walls 42, or may cover both the inside surface and the outside surface of the inflatable walls 42. The protective cover may substantially protect the inflatable walls 42 from puncture, from thermal elements, and/or may serve as a fireblock to aid in preventing the inflatable walls 42 from combusting. Moreover, the protective cover may attenuate unwanted sound (acoustic noise) from entering or leaving the compartment 10.

The inflatable walls 42 may include a left side wall 48, a back side wall 50, a right side wall 52, a top wall 54 (or ceiling), and a partition 56. In other embodiments, the inflatable walls 42 may include a bottom wall or floor surface. The inflatable walls 42 may have zippered seams (not shown) by which the walls are zippered together. In other embodiments, the inflatable walls 42 may be connected utilizing varying methods such as snap-fits, or may comprise one integral unseamed wall and/or enclosure. In still other embodiments, the inflatable walls 42 may include differing types, numbers, sizes, orientations, and/or configurations of inflatable members, such as an inflatable seat, an inflatable bed, or other inflatable devices.

The partition 56 may divides the compartment 10 into two bunk portions, enabling the compartment 10 to accommodate two people 58. In other embodiments, the compartment 10 may accommodate any number of people. The inflatable walls 42 may also comprise at least one air valve 60 for inflating the inflatable walls 42, and flaps 62 for attaching the inflatable walls 42 to the basin 20. The flaps 62 may comprise snaps, screws, or other fasteners. In some embodiments, the left side wall 48, back side wall 50, right side wall 52, top wall (or ceiling) 54, partition 56, and/or bottom wall or floor surface may be configured so that they may all be inflated by pumping gas into the single valve 60. In some embodiments, the inflatable walls 42 may be inflated to pressures between one pound per square inch and three pounds per square inch. In another embodiment, the inflatable walls 42 may be inflated to pressures less than 60 mbar. In other embodiments, some or all of the the left side wall 48, back side wall 50, right side wall 52, top wall 54, partition 56, and/or bottom wall or floor surface may each comprise a separate air valve, and/or may each be separately inflated to different pressures. In still other embodiments, the enclosure member 22 may be in differing shapes, sizes, orientations, and/or configurations.

FIG. 2 shows a partial sectional, side view within rectangle 2-2 of the embodiment depicted in FIG. 1. As shown, one or more bolster members 64 may be attached to an interior surface 66 of the side-walls 26 of the one-piece basin 20. The bolster members 64 may be made of fiber-glass or other materials, and may be attached to the side-walls 26 utiliizing snap-fits, screws, adhesive, or other types of fastening mechanisms. In other embodiments, the bolster member 64 may be integrally molded to side-wall 26. A cavity 68 may be recessed within a top surface 70 of bolster member 64. An end 72 of one or more inflatable gas walls 42 may be disposed within the cavity 68 of the bolster member 64 in between an interior surface 74 of the cavity 68 and an interior surface 66 of the side-wall 26. In such manner, the inflatable gas walls 42 may be attached to the side-wall 26. In other embodiments, the inflatable wall 42 may be attached directly to a floor surface of the compartment 10, such as to the base member 24 or to another floor surface.

A gas pump 76 and a pressure transducer 78 may be attached to bolster member 64. In other embodiments, the pump 76 and pressure transducer 78 may be attached to other areas of the compartment 10. The pump 76 may be utilized to infate the gas wall 42 from a deflated position to an inflated position in order to form a compartment wall 80. The transducer 78 may regulate pressure within the gas wall 42. The compartment wall 80 may comprise a combination of side-wall 26 and gas wall 42 which collectively extend the entire height 32 (shown in FIG. 1) of the compartment 10. In other embodiments, the compartment wall 80 may comprise solely gas wall 42 such as in the situation when gas wall 42 is attached directly to a floor surface of the compartment 10. When the gas wall 42 is inflated to form erect compartment wall 80, the inflation of end 72 of gas wall 42 may lock gas wall 42 in place between the bolster member 64 and side-wall 26 utilizing a gas-bulb lock. For instance, when end 72 is inflated, a portion 82 of end 72 may extend laterally past an end portion 84 of bolster member 64 locking end portion 84 against side-wall 26 thereby preventing end 72 from becoming un-attached from side-wall 26 and bolster member 64. In other embodiments, varying locking mechanisms may be uitlized to lock gas wall 42 in place.

Figure 3:
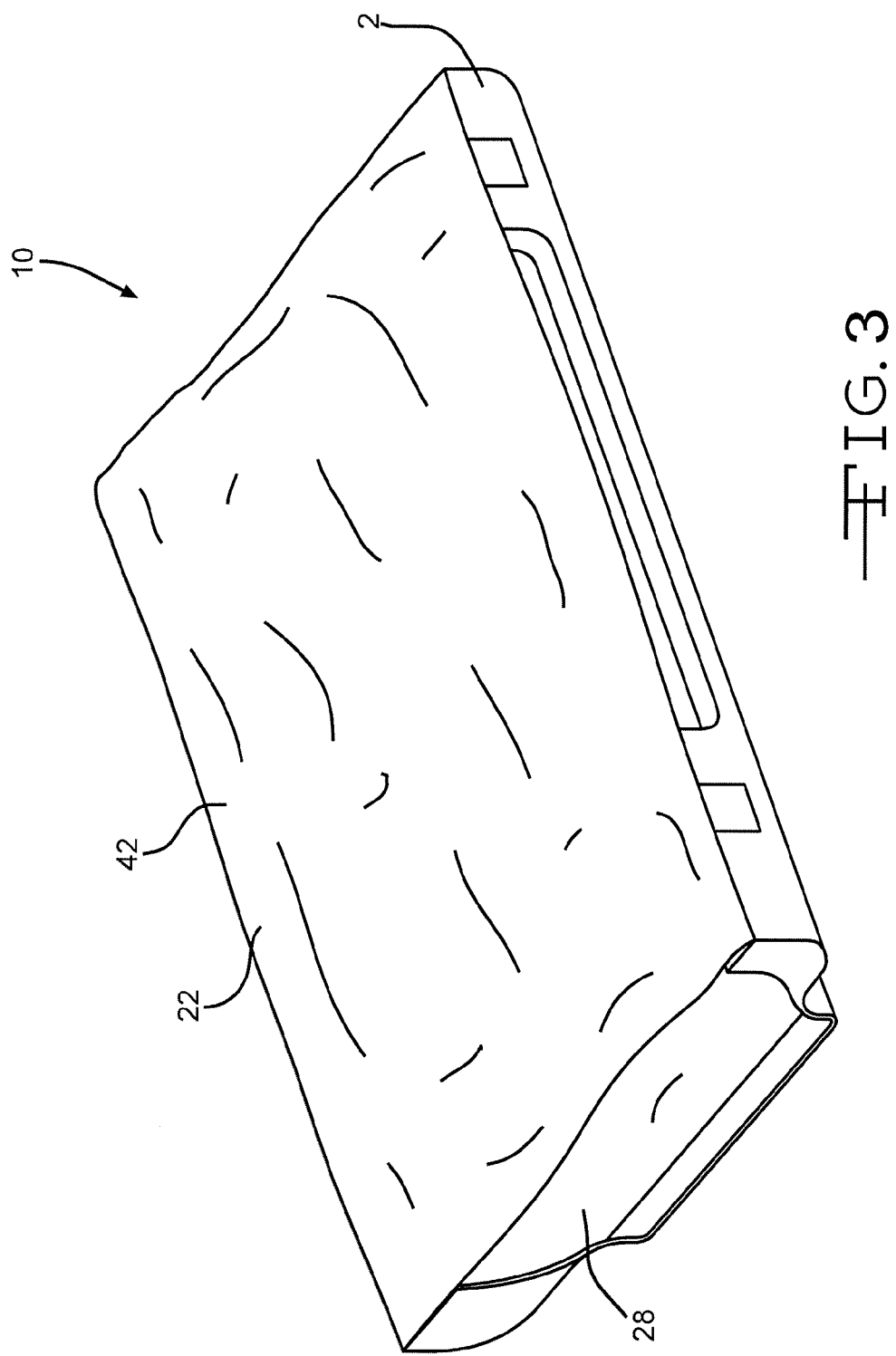
FIG. 3 shows a perspective view of the one-piece basin of FIG. 1 with the attached enclosure member in a deflated position.
Figure 4:
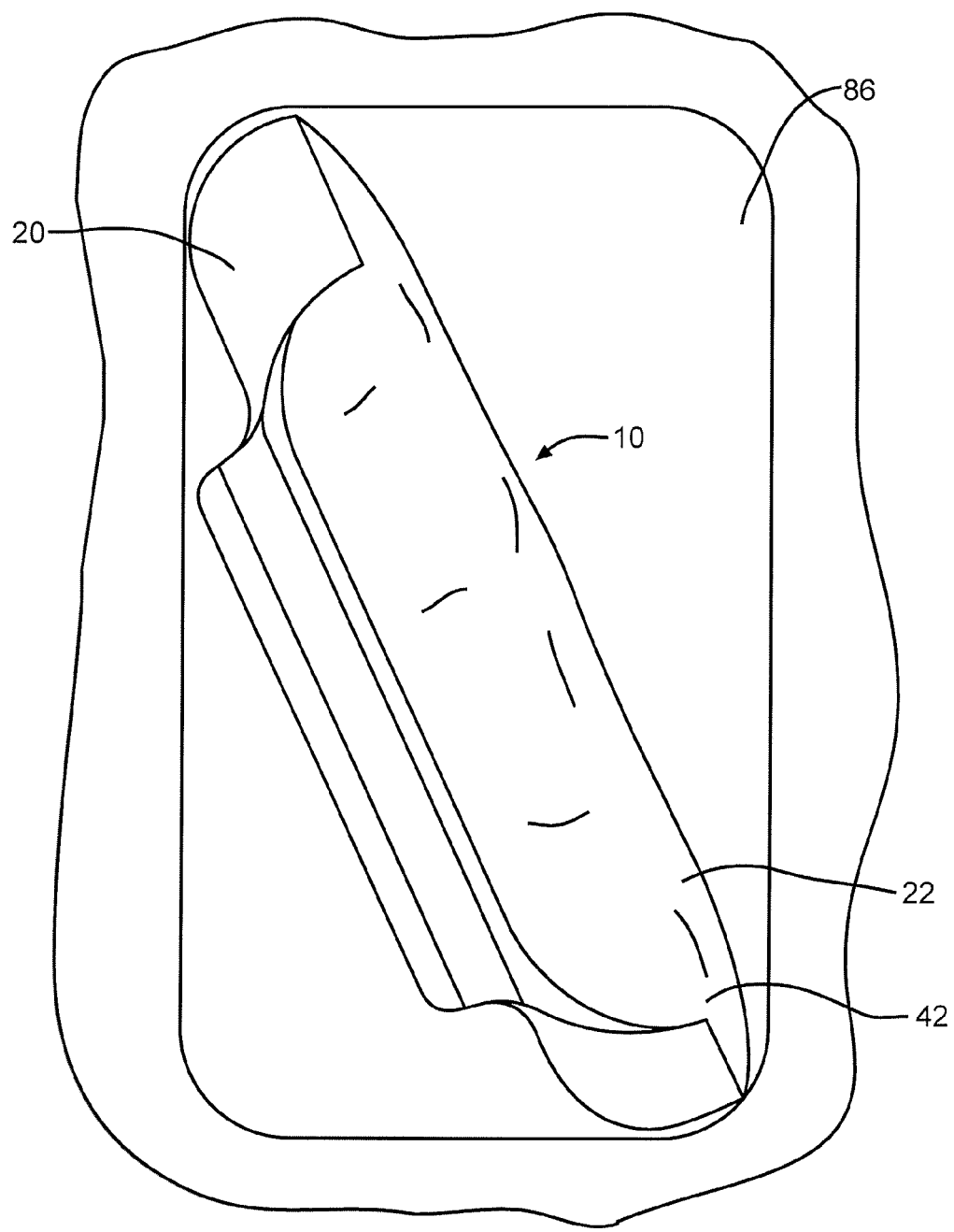
FIG. 4 shows a front view of the one-piece basin of FIG. 3 being fitted through an opening in a transportation device.

FIG. 3 shows a perspective view of the basin 20 of FIG. 1 with the attached enclosure member 22, which in this embodiment is a gas wall 42, in a deflated position. As shown, the gas wall 42 may be deflated so that it substantially retracts within cavity 28 of basin 20. When the gas wall 42 is in a deflated position, the size of the one-piece basin 20 may enable the compartment 10 to be fitted through an opening 86 (as shown in FIG. 4) in the transportation device. The opening may comprise a door or other opening in the transportation device.

FIG. 4 depicts a front view of the one-piece basin 20 of FIG. 3 being fitted through an opening 86 in a transportation device. In such manner, the compartment 10 may be brought into a transportation device with the gas wall 42 in the deflated position, the basin 20 may be installed into position within the transportation device, and the gas wall 42 may be inflated to enclose the compartment 10. In other embodiments, the enclosure member 22 may be brought into the transportation device separately from the one-piece basin 20, and installed to the one-piece basin 20 within the transportation device.

Figure 5:
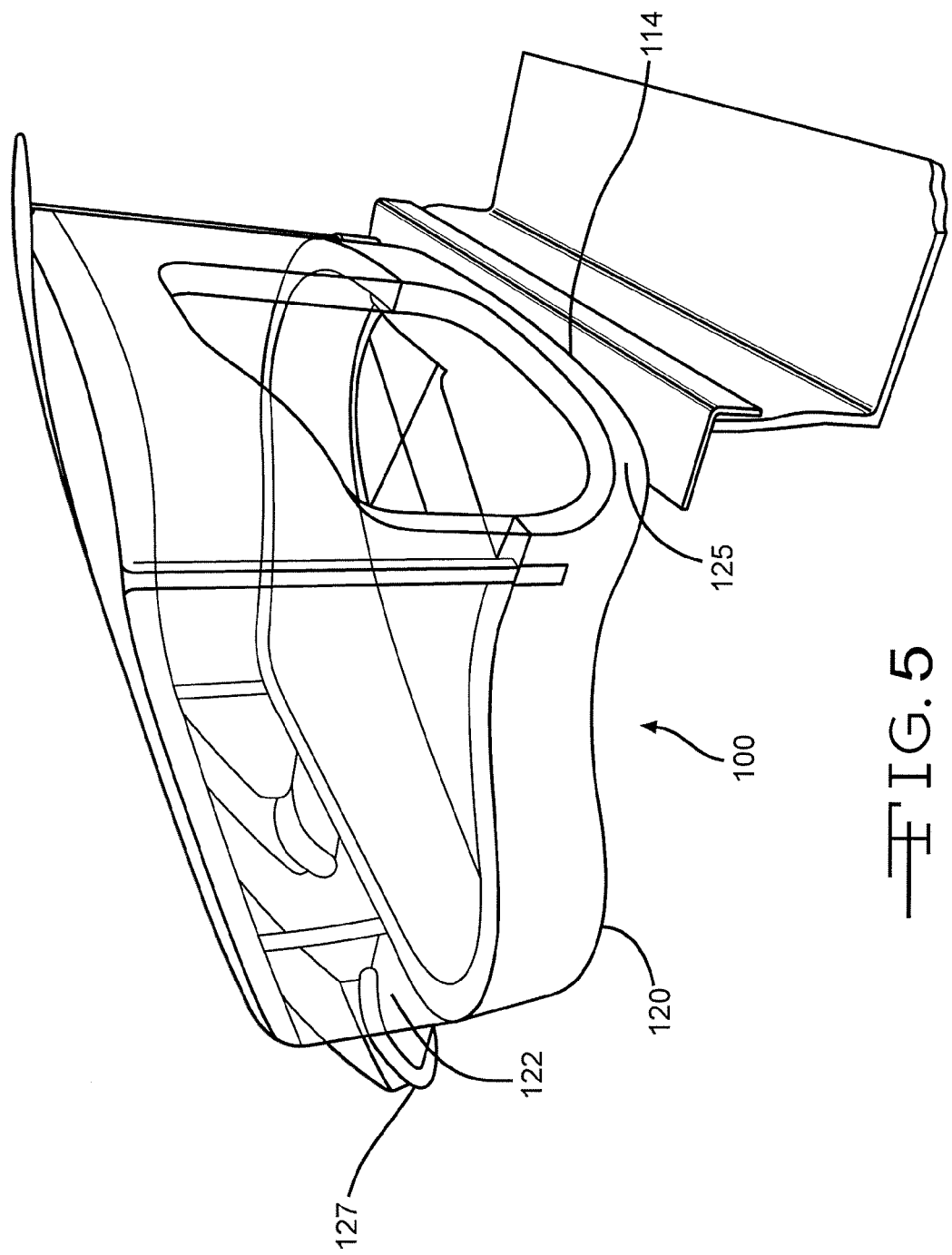
FIG. 5 shows a perspective view of another embodiment of a compartment having a curved one-piece basin and a curved, attached, retractable, and extendable enclosure member shown in an inflated, extended state.

FIG. 5 depicts a perspective view of another embodiment of a compartment 100 having a curved one-piece basin 120 and a curved, attached, retractable, and extendable enclosure member 122 shown in an inflated, extended state. A portion 125 of the basin 120 may be aligned at the top of a stairway 114 within the transportation device. One or more support arms 127 may be attached to the basin 120 in order to attach the compartment 100 to the transportation device.

Figure 6:
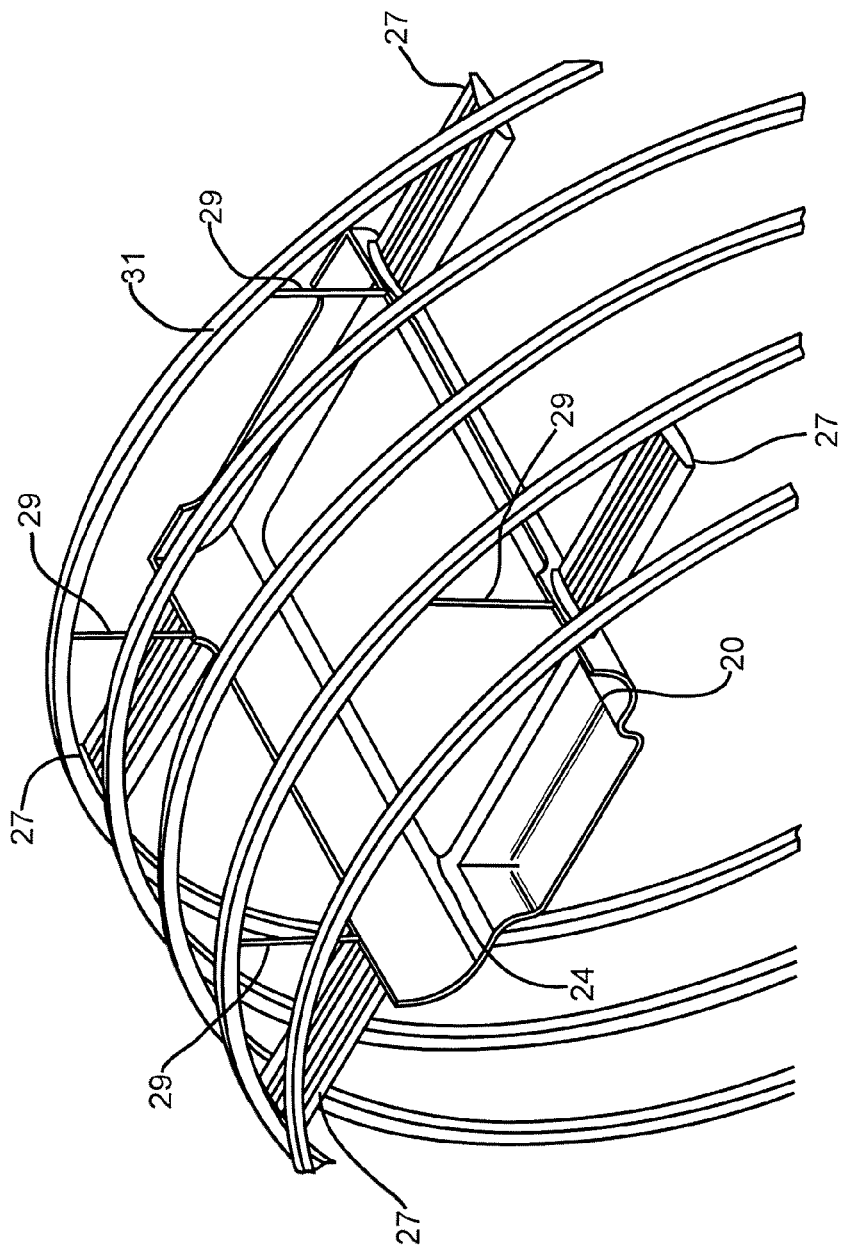
FIG. 6 shows a perspective view of the one-piece basin of FIG. 1 installed in a transportation device utitlizing a plurality of multi-directional support arms and tension members.

FIG. 6 depicts a perspective view of the one-piece basin 20 of FIG. 1 installed in a transportation device utilizing a plurality of multi-directional support arms 27, in addition to a plurality of tension members 29, to attach the basin 20 to a frame 31 of the transportation device. In other embodiments, the multi-directional support arms 27 may be utilized to attach any compartment or interior component or structure, such as an internal aircraft structure, to at least one of a skin of the transportation device, a frame of the transportation device, or to an inter-costal member connected to the frame of the transportation device. The attached interior aircraft components may comprise one or more of a monument, stowage area, galley area, system rack, partition, stairway, rest area, stowage bins, and/or other types of internal parts. The multi-directional support arms 27 may be attached to the internal structure, skin of the transportation device, frame of the tranpiration device, and/or to the inter-costal member connected to the frame of the transportation device utilizing bolts, fasteners, snap-fits, or through other mechanisms.

The multi-directional support arms 27 may be installed in a substantially horizontal orientation extending between the frame 31 and the basin 20, while the tension members 29, which may be under only tension load, may be installed in a substantially vertical orientation and/or upward orientation extending between the frame and the basin 20. This configuration may substantially maximize space in order to locate one or more aircraft systems, such as an electrical system, gas ducting, ECS ducting, water system, or other type of system within the transportation device. In other embodiments, one or more aircraft systems may be run through one or more cavities within the multi-directional support arms 27 to further increase space utilization. In additional embodiments, the tension members 29 may be connected to a skin and/or a inter-costal member of the transportation device.

In other embodiments, the multi-directional support arms 27 and tension members 29 may be installed in varying numbers, locations, orientations, and configurations. The base member 24 of the basin 20 may be installed in a substantially horizontal position within the transportation device in order to act as a floor surface of the compartment 10 (as shown in FIG. 1). After the basin 20 is installed within the transportation device, the enclosure member 22 (as shown in FIG. 1) may be extended and/or inflated to a substantially vertical position to form the enclosure of the compartment 10. In other embodiments, the basin 20 and enclosure member 22 (as shown in FIG. 1) may be in other locations, orientations, and/or configurations.

Traditional tie-rod members, which are usually used to attach interior components to transportation devices, are typically only axially loaded, and are typically oriented as close to parallel with the skin and/or frame of the transportation device as possible, in order to decrease tension load on the skin and/or frame and to transfer as much shear load as possible. This may require substantial attachment hardware in order to position the tie-rod members in an optimal angle with the airplane skin, may require a large number of tie-rod members to be utilized, may require inefficient use of space, may make it difficult to attach internal structures, and may make the installation process costly.

Unlike traditional tie-rod members, the multi-directional support arms 27 may be under both shear, tension, bending, and compressive loads in multiple directions, such as at least partially X, Y, and Z directions (as shown in FIG. 9), and may be adapted to be moved, rotated, and/or oriented into varying locations, configurations, and/or orientations. The use of multi-directional support arms 27, which may allow for the carrying of both shear, tension, bending, and compressive loads in at least partially X, Y, and Z directions, may allow for the transfer of shear loads directly to the skin and/or frame of the transportation device in a multitude of directions. As a result, the multi-directional capabilities of the support arms 27 may allow for the support arms 27 to be attached to the skin and/or frame in varying angles of orientation. Therefore, less attachment hardware may be required to attach the multi-directional support arms 27 to the skin and/or frame of the transportation device. This may free up space, may make it less difficult to install the support arms 27, may make the installation process less timely, and/or may make the installation process less expensive. In other embodiments, the support arms 27 may be integral to the body of the transportation device, such as a composite fuselage in an aircraft, effectively acting as an extension of the transportation device.

Figure 7:
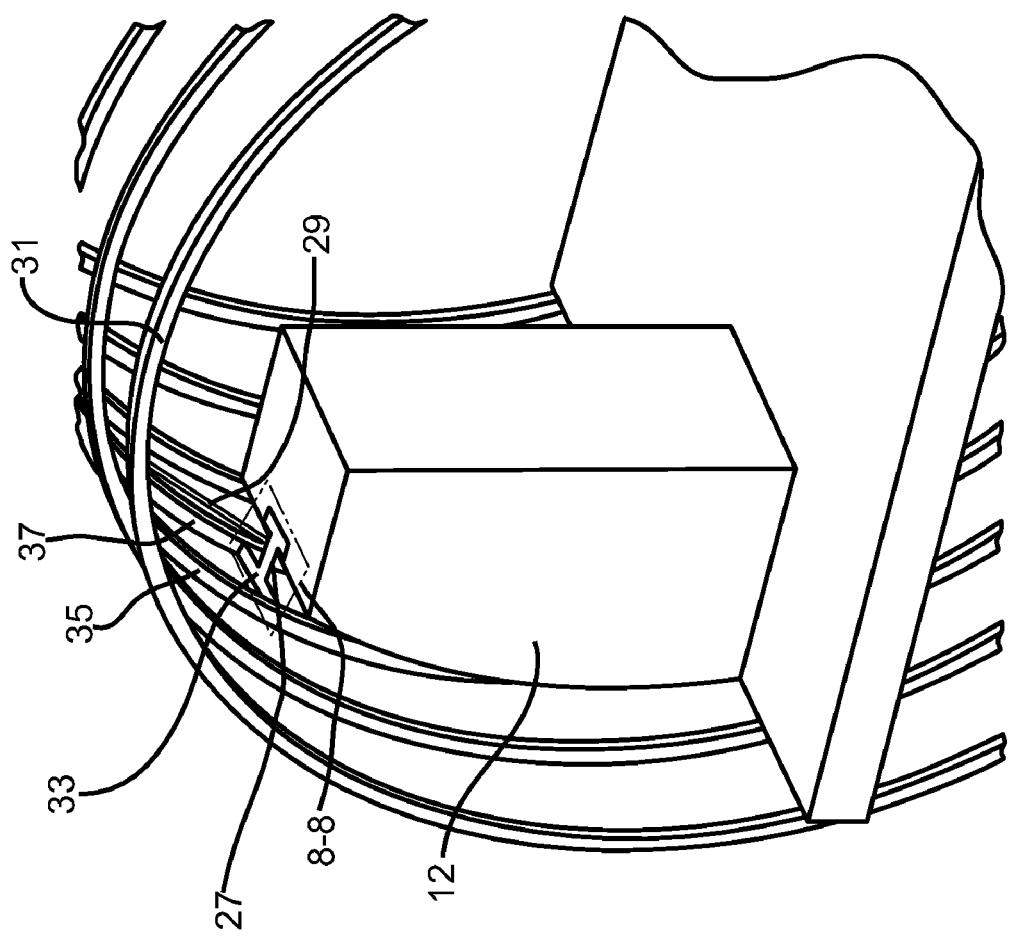
FIG. 7 shows a perspective view of one embodiment of a monument installed in a transportation device.

FIG. 7 depicts a perspective view of one embodiment of a monument 12 installed in a transportation device. A multi-directional support arm 27 is attached at one end to the monument 12 and at another end to intercostal member 33 which extends between a plurality of frame members 35 and 37 of the frame 31 of the transportation device. A tension member 29 is attached at one end to the monument 12 and at another end to frame 31. In other embodiments, one or more multi-directional support arms 27 and/or tension members 29 may be utilized to attach monument 12 directly to a skin and/or frame of the transportation device.

FIG. 8 shows a partially, unassembled perspective view, within rectangle 8-8 of the embodiment depicted in FIG. 7, illustrating the attachment of two separate parts 43 and 45 of multi-directional support arm 27. As shown, part 43 of the multi-directional support arm 27 is attached to intercostal member 33, while part 45 of the multi-directional support arm 27 is attached to monument 12. The two parts 43 and 45 of the multi-directional support arm 27 may be attached together utilizing fasteners, fittings, or other attachment mechanisms. The use of two separate interconnectable parts 43 and 45 may allow for efficient installment of the monument 12 to intercostal member 33. For instance, part 43 of the multi-directional support arm may be attached to intercostal member 33. Part 45 may be attached to monument 12. Subsequently, monument 12 may be located into position in order to attach the fasteners, fittings, or other attachment devices of parts 43 and 45 together in order to attach monument 12 to intercostal member 33. In other embodiments, varying attachment mechanisms and methods may be utilized to connect varying portions of support arm 27.

FIG. 9 depicts a partially unassembled, perspective view, within rectangle 9-9 of the embodiment shown in FIG. 8, depicting intercostal member 33 and part 43 of multi-directional support arm 27 with part 45 (as shown in FIG. 8) removed. As shown, part 43 of multi-directional support arm 27 may comprise a plurality of interior linear members 47 which are substantially oriented in the Y and Z directions (with some X direction orientation), a connected exterior elliptical curved member 49 which is is oriented at least partially in the X, Y, and Z directions, and interior extending cavities 51. Part 43 may be integrally molded in order to form linear members 47 and curved member 49. The multi-directional components 47 and 49 of part 43 may allow for the transfer of shear and tension loads from part 43 to intercostal member 33 in multiple directions and orientations.

One or more systems, such as an electrical system, gas ducting, ECS ducting, a water system, or other type of system, may be extended through interior cavities 51 within part 43. In such manner, the support arm 27 may be configured to substantially maximize space. Part 45 (as shown in FIG. 8) may have the same configuration as part 43. In such manner, when parts 43 and 45 are connected, shear and tension loads may be transferred in varying directions from monument 12 (as shown in FIG. 7), through the multi-directional support arm 27, to intercostal member 33, to frame 31 (as shown in FIG. 7) of the transportation device. Moreover, one or more systems may be extended through an interior of multi-directional support arm 27.

In other embodiments, multi-directional support arm 27 may be made of one or more parts in varying types, shapes, sizes, configurations, locations, and/or orientations. In additional embodiments, multi-directional support arm 27 may be configured to direct tension and shear loads in a multitude of varying directions to differing surfaces in various locations.

Figure 10:
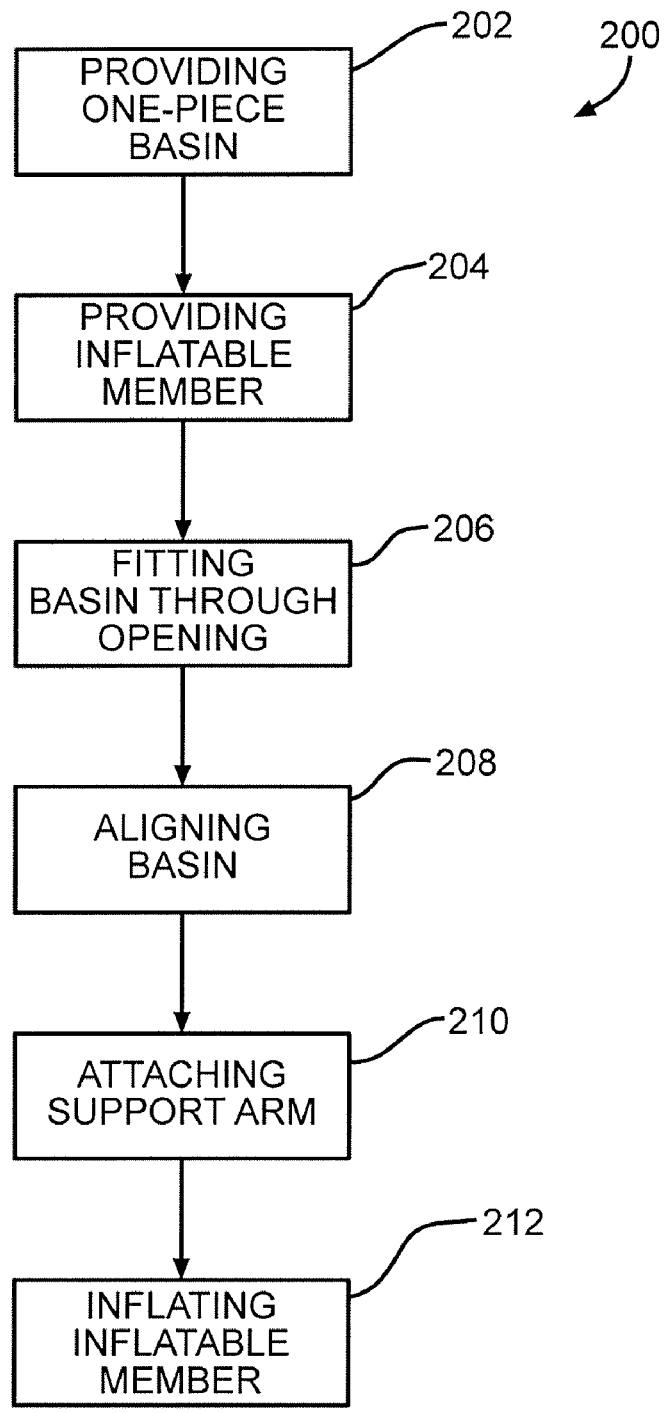
FIG. 10 shows a flowchart depicting one embodiment of a method of installing a compartment in a transportation device.

FIG. 10 shows a flowchart depicting one embodiment 200 of a method of installing a compartment in a transportation device. In one step 202, a one-piece basin having a base member may be provided. The one-piece basin may comprise any of the embodiments disclosed herein. In another step 204, an inflatable member (and/or a retractable and/or extendable enclosure member) having an internal cavity may be provided. The inflatable member may comprise any of the embodiments disclosed herein. In other embodiments, any of the basin, enclosure member (and/or inflatable wall member), and/or support arm embodiments described herein may be provided during a step of the method of installation.

In an additional step 206, the one-piece basin may be fitted through an opening in the transportation device. In such manner, the one-piece basin may be located within an interior of the transportation device. During this step, the basin may be rotated into a substantially vertical plane and/or positioned to fit the basin through the opening into the transportation device. A loading tool may be utilized during this process. For instance, the basin may be loaded on the loading tool, which may be wheeled through a door of the transportation device.

In other embodiments, varying equipment and processes may be utilized to fit the basin through the opening into the transportation device. In one embodiment, the inflatable member (and/or retractable and/or extendable enclosure member) may be attached to the basin in a deflated position (or retracted position) when the basin is fitted through the opening into the transportation device.

In another embodiment, the inflatable member (and/or retractable and/or extendable enclosure member) may be attached to the basin in a deflated or inflated position (retracted or extended position) after the basin has been fitted through the opening into the transportation device. The inflatable member may be aligned in a non-parallel direction with respect to a side-wall surface of the basin. In other embodiments, the inflatable member may be aligned in a non-parallel direction to a floor surface of the compartment.

In still another step 208, the one-piece basin may be aligned so that the base member forms a floor surface of the compartment. After alignment, the basin may be in a substantially horizontal plane, and the side-wall of the basin may not extend a full height of the compartment. This step may comprise placing the loading tool and the one-piece basin in the proper position to install the basin to form the compartment. A winch, safety strap, and/or the loading tool may be utilized to raise the basin into the correct position in the air. In other embodiments, varying apparatus and methods may be utilized to align the basin into the proper position to act as a floor surface of the compartment.

In yet another step 210, one or more support arms may be attached between the one-piece basin and one or more portions of the transportation device. The support arms may be put under shear and tension loads in multiple directions, such as in at least partially X, Y, and Z directions. The support arms may have been attached to the basin and/or transportation device prior to the basin being fitted into the airplane, and may be rotatable from a non-installed position to an installed position. In another embodiment, the support arms may be attached to the basin and/or transportation device after the basin is fitted into the airplane.

The support arms may comprise any of the embodiments herein disclosed, while the portions of the transportation device may comprise a skin of the transportation device, a frame of the transportation device, and/or an intercostal member attached to the frame of the transportation device. The support arms may be attached utilizing any of the attachment methods described herein. In one embodiment, each support arm may comprise one part and may be attached to the basin and to the portions of the transportation device utilizing fittings, bolts, fasteners, and/or other mechanisms. These devices may be automatic and may be activated remotely. In other embodiments, these devices may be activated manually.

In another embodiment, each support arm may comprise multiple parts which are attached at different times respectively to one of the basin and/or portion of the transportation device. The support arm part attached to the basin may then be attached to the support arm part attached to the portion of the transportation device in order to form one complete support arm which attaches the basin to the transportation device. This may be achieved utilizing fittings, bolts, fasteners, and/or other mechanisms, which may be activated manually or automatically. A primary load of the compartment may be placed on the basin. The basin may be attached to a monument, walkway, stairway, and/or to another type of apparatus. In other embodiments, rather than being attached to a basin, the support arms may be attached to one or more internal structures with the transportation device such as a monument, a stowage area, a system rack, a partition, a stairway, a rest area, or to another type of internal structure. In additional embodiments, the support arms may be oriented to substantially maximize space for systems within the transportation device.

In an additional step 212, the inflatable member may be inflated to form a wall of the compartment. The inflatable member may be inflated utilizing air, an inert gas such as Argon, or other types of gas. A pump or other apparatus may be utilized to pump gas into a cavity of the inflatable member in order to inflate the wall. In such manner, an enclosure around the basin may be formed in order to complete the compartment. The inflatable member may provide a comfortable, nurturing environment for the compartment's occupants. In other embodiments, the inflatable member may be used as a mechanism to transport and recirculate air for the compartment's occupants. The wall of the compartment may comprise a combination of the basin side-walls and the inflatable member. In other embodiments, the wall of the compartment may comprise solely the inflatable member. The inflated enclosure may include side-wall surfaces, ceiling surfaces, partition surfaces, floor surfaces, seat surfaces, bed surfaces, and/or other surfaces. One or more zippered seams may be zipped together in order to attach multiple parts of the inflatable member together. In other embodiments, the inflatable member may be one part.

In other embodiments, power lines and various systems may be connected to the compartment. These systems may comprise any systems of the transportation device, such as electrical, venting, ducting, water, and other types of systems.

In additional method embodiments, the basin of the compartment may be installed separately, the inflatable wall of the compartment may be installed separately, the support arms may be installed separately, and/or any combination of the basin, inflatable wall, and/or support arms may be installed. Any of the herein disclosed basin, inflatable wall (and/or enclosure member), and/or support arm embodiments may be utilized in any of these method embodiments.

Although this invention has been described in terms of certain preferred embodiments, other embodiments that are apparent to those of ordinary skill in the art, including embodiments that do not provide all of the features and advantages set forth herein, are also within the scope of this invention. The scope of the present invention is defined only by reference to the appended claims and equivalents thereof.

We claim:

1. A single support arm system comprising a single support arm comprising a member having a substantially elliptical cross-section and a plurality of interior cavities,
    said support arm being attached at only a single location to an interior component and attached at only another single location to at least one of a frame of said aircraft or an inter-costal member connected to said frame of said aircraft, and
    at least one of said interior cavities being configured for at least one of an electrical system, gas ducting, ECS ducting, or a water system to be extended therethrough.

2. The single support arm of claim 1 wherein said interior component comprises at least one of a monument, a stowage area, a galley area, a system rack, a partition, a stairway, a rest area, or stowage bins.

3. The single support arm of claim 1 wherein said single support arm is attached at the only another single location to the inter-costal member connected to said frame of said aircraft and said inter-costal member extends between a plurality of members of said frame.

4. The single support arm of claim 1 wherein said single support arm is integrally molded to form a linear member and a curved member.

5. An aircraft comprising a single support arm, said single support arm comprising a member having a substantially elliptical cross-section and a plurality of interior cavities, said support arm being attached at only a single location to an interior component and being attached at only another single location to at least one of a frame of said aircraft or an inter-costal member connected to said frame of said aircraft, and said single support arm transferring shear loads in more than one direction, with at least one of an electrical system, gas ducting, ECS ducting, or a water system extending within at least one of said interior cavities.

6. The aircraft of claim 5 wherein said single support arm is oriented to substantially maximize space for one or more aircraft systems.

7. The aircraft of claim 5 wherein said single support arm is in a substantially horizontal orientation extending between a frame of said aircraft and said interior component.

8. The aircraft of claim 5 wherein a separate tension support member is also attached to said interior component and said separate tension support member is also attached to said frame connected to said frame of said aircraft, wherein said separate tension support member extends upwardly.

9. The aircraft of claim 5 wherein the single support arm is under each of the shear, the tension, and the compression loads in multiple of the X, Y, and Z directions, wherein the X direction is along a width of the single support arm, the Y direction is along a height of the single support arm, the Z direction is along a length of the single support arm, and each of the X, Y, and Z directions extend perpendicularly to one another.

10. The aircraft of claim 9 wherein the single support arm is under the shear load in the X and Y directions.

11. The aircraft of claim 9 wherein the single support arm is under the tension load in the X, Y, and Z directions.

12. The aircraft of claim 9 wherein the single support arm is under the compression load in the X, Y, and Z directions.

13. The aircraft of claim 9 wherein the single support arm is under the shear load in the X and Y directions, the tension load in the X, Y, and Z directions, and the compression load in the X, Y, and Z directions.

14. The aircraft of claim 13 wherein the single support arm is not under the shear load in the Z direction.

15. A single support arm system comprising a single support arm comprising a member having a substantially elliptical cross-section and a plurality of interior cavities,
    said support arm being attached at only a single location to an interior component and attached at only another single location to at least one of a frame of said aircraft or an inter-costal member connected to said frame of said aircraft, and
    said support arm being configured for undergoing tension load in each of a X, Y, and Z directions, wherein the X direction is along a width of the single support arm, the Y direction is along a height of the single support arm, the Z direction is along a length of the single support arm, and each of the X, Y, and Z directions extend perpendicularly to one another.

16. The single support arm of claim 15 wherein the single support arm is configured for undergoing a compression load in each of the X, Y, and Z directions.

17. The single support arm of claim 15 wherein the single support arm is configured for undergoing a shear load in each of the X and Y directions.

* * * * *